United States Patent [19]

Miller

[11] Patent Number: 5,006,022

[45] Date of Patent: Apr. 9, 1991

[54] AXIALLY MOVABLE TOOL AND GUIDE

[76] Inventor: Bernard Miller, 5600 Munhall Rd., Pittsburgh, Pa. 15217

[21] Appl. No.: 346,903

[22] Filed: May 2, 1989

[51] Int. Cl.[5] .............................................. B23B 49/00

[52] U.S. Cl. ...................................... 408/16; 408/712; 408/110; 408/241 S

[58] Field of Search ............... 408/129, 712, 234, 100, 408/99, 16, 14; 310/47; 173/170; 33/638, 574, 666

[56] References Cited

U.S. PATENT DOCUMENTS

| | | | |
|---|---|---|---|
| 3,060,769 | 10/1962 | Heider | 408/712 X |
| 3,100,408 | 8/1963 | Pufahl . | |
| 3,827,822 | 8/1974 | Converse | 408/110 |
| 4,314,782 | 2/1982 | Beekenkamp | 408/712 X |

*Primary Examiner*—Z. R. Bilinsky
*Assistant Examiner*—Robert Schultz
*Attorney, Agent, or Firm*—Clyde I. Coughenour

[57] ABSTRACT

An axially moveable portable tool, such as a drill, and a guide for the tool are disclosed. The tool is provided with a gripping means and an internal guideway parallel to the axis of tool movement on the grip side of the tool. The guide has a base with a post and a handle attached to and extending from the base. The post and handle are positioned so that a projection of the line of force applied during use to the tool grip and to the handle, both fall substantially within the base footprint. The portable tool can be attached to the post to assume a specific angle with the base and can be easily removed from it for independent use.

19 Claims, 2 Drawing Sheets

AXIALLY MOVABLE TOOL AND GUIDE

BACKGROUND OF THE INVENTION

Portable hand tools are in common use. These tools are relatively inexpensive to purchase and convenient to use. The two major problems encountered are the safety of the worker and accuracy of the work performed. To overcome these problems many solutions have been proposed. One of the most common proposals is attachments such as guides and supports for use with the tools. Most of these devices require that one or both hands be on the tool with no separate provision made for stabilization of the attachment. When a separate provision is made, it is usually necessary to balance the force applied to the tool.

It is common to have the line of force that is applied to the tool, and/or guide, project outside and beyond the guide base. This creates a clumsy hold and a torque that tends to move the guide and prevent an accurate location and maintenance of the guide on the work, and tends to preclude an accurate and constant angle for tool advancement. Examples are the patents to A. J. Daniels, U.S. Pat. No. 2,831,376 issued Apr. 22, 1958 and E. W. Purkey, U.S. Pat. No. 3,250,153 issued May 10, 1966. To balance this force or torque, handles have been added; A. C. Carles, U.S. Pat. No. 2,953,045, issued Sept. 20, 1960 and R. O. Hudson, U.S. Pat. No. 4,080,092, issued Mar. 21, 1978. Even when one of the forces on the tool or a handle is in line with the area encompassed by the base, the other is placed in opposition to that force or creates a torque with respect to it; J. P. Pufahl, U.S. Pat. No. 3,100,408, issued Aug. 13, 1963 and L. E. Pugsley, U.S. Pat. No. 3,107,556, issued Oct. 22, 1963.

When guideways are associated with tools they are often circular and either permit rotation of the tool about the guide or require two posts; L. J. Leitner et al, U.S. Pat. No. 2,837,939, issued Jun. 10, 1958 and I. J. Epstein, U.S. Pat. No. 4,279,552, issued July 21, 1981. Those that are not circular are placed on the side of the tool or opposite the tool grip, reducing visibility and the ability of the tool to access areas such as corners; M. Van Praag, U.S. Pat. No. 3,242,773, issued Mar. 29, 1966 and G. C. Lipe, U.S. Pat. No. 3,746,460, issued Jul. 17, 1973. Non-circular posts, adjustable stops on posts, and graduations on posts, per se, are old in the art; A. T. Abell, U.S. Pat. No. 3,853,420, issued Dec. 10, 1974, N. A. Lopez, U.S. Pat. No. 2,050,709, issued Aug. 11, 1936, and A. Boyajian, U.S. Pat. No. 3,838,935, issued Oct. 1, 1974.

SUMMARY OF THE INVENTION

The present invention is an improvement over the tool guides and supports of the prior art. The tool is provided with a guideway that is on the same side as the gripping means, so that visibility in the cutting zone, and the ability to access corners, is unimparied. By the use of any shape non-circular guideway, rotation of the tool on the guide is precluded, assuring linear movement using only one post. The guide means is provided with a base that supports a post in essentially the shape of the guideway of the tool, and a handle for location, placement and retention of the guide on the work before and during use of the tool. The handle is located and positioned on the base so that pressure applied to the base through it projects within the footprint defined by the area encompassed by the base. The post is located on the base so that the gripping means of the tool, when attached, moves with respect to the base in a line that falls within the footprint of the base. While not necessary in the preferred embodiment, the post is perpendicular to the base. Even the novice can accurately position and make perpendicular cuts. By this arrangement, the handle permits one hand of the operator to locate the base on the work and press the base to the work while the other hand is free to advance the tool.

Both the force on the handle and any portion of the force on the gripping means that reaches the base add to press the base onto the work. For greater retention of the base on the work, the base can be provided with apertures used with attachment means such as screws or sharpened pins or friction feet. Any type surface from soft to hard, flat material can be accurately worked on. Slots or other openings can be provided on one end or two sides of the base to receive slidable means for adjusting the angle at which the base rests on the work and thus the angle that the tool penetrates the surface worked on. Graduations can be placed on the post so that the depth of penetration can be observed. Adjustable slide stops can be placed on the post to mechanically limit penetration and give depth control.

By use of the invention, the safety and accuracy of a conventional bench-mounted tool is more nearly achieved while using inexpensive portable hand tools. The invention accomplishes the increased safety and accuracy with a simplified, relatively inexpensive, structure that can be made of commonly used materials. Since one hand is used to grip the tool and one the guide in a stable manner, the possibility of accident or injury is reduced. The non-circular configuration of the single post and guideway assures linear advancement of the tool. The material forming the slot, usually being weaker than that of the post, has its shape and dimensions protected due to its internal positioning.

Accordingly, it is the object of the present invention to provide:

- a device that is compact and immediately, easily, and safely usable upon purchase without modification, assembly, or disassembly by a worker having minimal skills;
- a device with a guide means that enables even an unskilled worker to drill perpendicular holes into a surface or, with adjustment, at select angles to the surface;
- a simple guide that easily permits a tool to be engaged to a guide post for controlled angular use and to be removed therefrom for independent use;
- a tool with an internal guideway in such a position that it does not interfere with visibility in the cutting zone;
- a tool that can be independently used in hard-to-reach areas, such as corners, as a conventional power tool unencumbered with attachments;
- a post on a base, located so that the force applied to the tool guided by the post projects within the area encompassed by the base footprint;
- a handle on a base that supports a tool guide with means for controlling the depth of penetration;
- a means to adjust the angle between the base and work surface; and
- a tool guide that can be used on a horizontal, vertical, angled or overhead surface.

DETAILED DESCRIPTION OF THE PREFERRED EMBODIMENT

Figure 1:
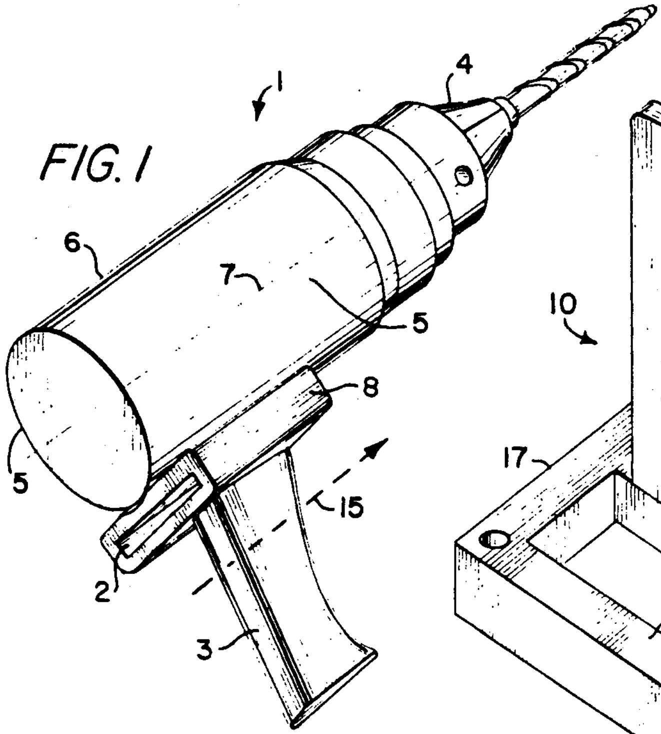
FIG. 1 is a perspective view of the tool, shown as a drill, with an internal guideway.

In accordance with the present invention, a tool, such as a drill shown in FIG. 1, is provided with an internal guideway (8) with a through opening or slot (2) on the same side as the tool gripping means (3) between the gripping means and tool axis (7). Such positioning leaves the front (6) and sides (5) of the tool and, for example, the cutting means holder or chuck assembly of a drill (4) accessible for use of a drill key and permits unobstructed visibility in the cutting zone during use. The guideway slot (2) is parallel to the tool axis so that the line of force (15) applied to the tool grip advances the tool toward and into the work at the angle determined by the positioning of the guide post.

Figure 2:
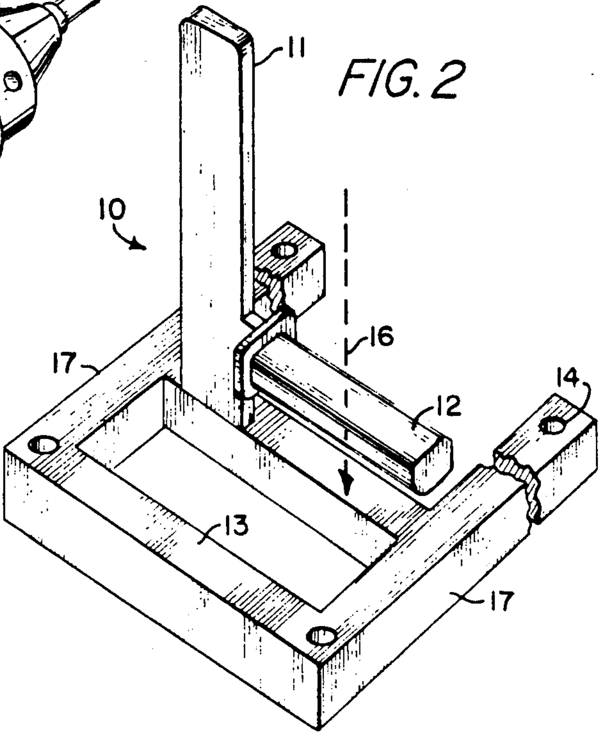
FIG. 2 is a perspective view of the preferred embodiment of the guide means.

As shown in FIG. 2, the guide means (10) consists of a base (13,17), a post (11), and a handle (12). The base with cross members (13) and spaced supports (17), can take any convenient configuration, such as spaced supports in the form of an H or an A with parallel legs or a U, etc., so long as the footprint or area encompassed is large enough to enclose the projection of the lines of force (15,16) applied to the handle and tool grip. The base shown has the spaced supports (17) with an open area thereinbetween positioned by base cross members (13). It is preferred because it can be used on narrow work such as 2×4's. The handle (12) can be positioned at any point within the footprint; it can project inwardly from any area on the periphery of the base or can be attached to the post. The lower end of the post (11) can be positioned at any point within the footprint of the base. In the preferred embodiment of FIG. 2 the handle (12) is secured to the lower end of the post (11) with at least the central and upper extent of the post being of uniform cross-section and free of obstructions. To have both the post and handle positioned reasonably close to the center of the footprint, the post is offset from the center of the base footprint.

Figure 3:
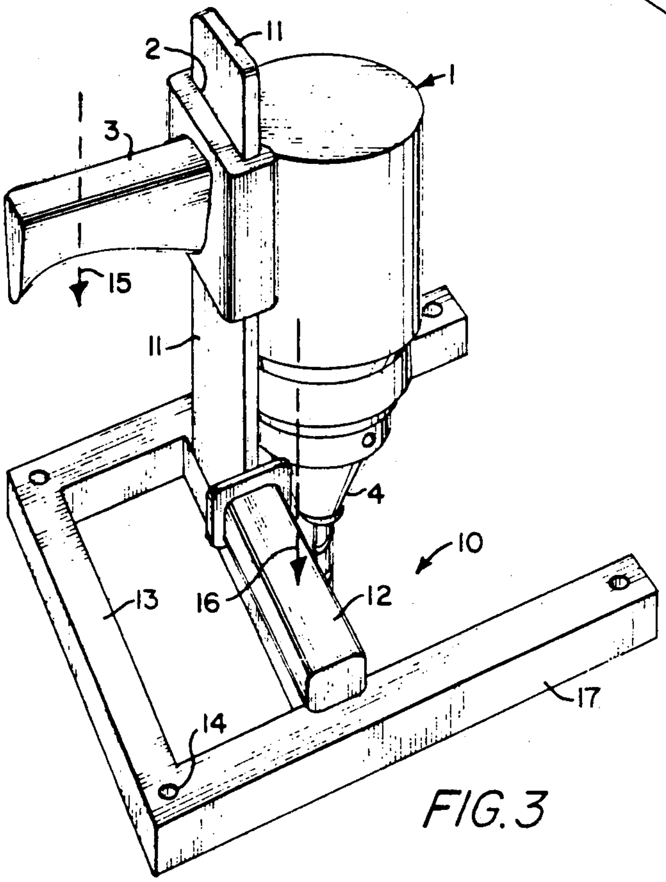
FIG. 3 is a side elevational view of the tool positioned on the guide means.

FIG. 3 shows the tool (1) positioned on the post (11). It can be seen that both the force (15) applied to the grip and force (16) applied to the handle, project within the footprint of the base (13,17).

Figure 4:
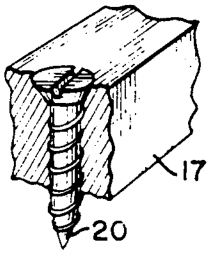
FIGS. 4, 5 and 6 are sectional views of supplemental securing means.
Figure 5:
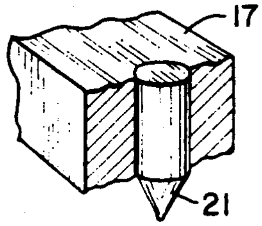
Figure 6:
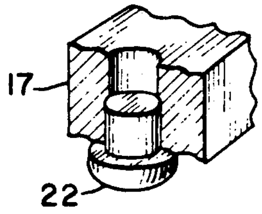

If a more secure attachment of the base to the work is desired, added means may be provided. Such means are shown in FIGS. 4–6, as screws (20), sharpened pins (21), and friction feet (22) positioned in apertures (14) provided in the base cross members (13) or supports (17).

Figure 7:
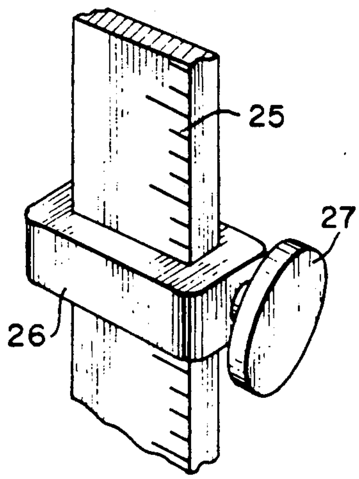
FIG. 7 is a fragmentary view of the post with graduations and stop means.

As shown in FIG. 7, the post is provided with graduated markings (25), so that the depth of penetration of the tool into the work can be calculated, and an adjustable stop (26), to mechanically limit penetration or cut depth.

Figure 8:
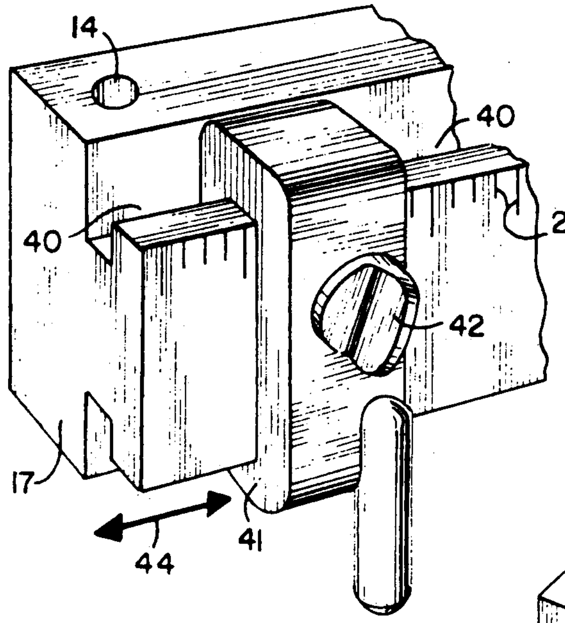
FIGS. 8 and 9 are fragmentary views of base angle adjustment means.
Figure 9:
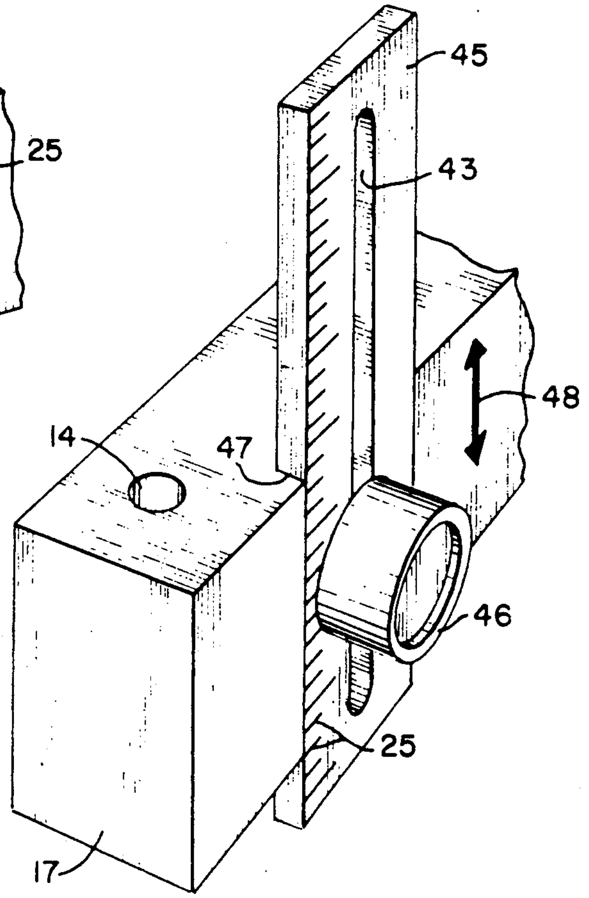

As shown in FIGS. 8 and 9, the base can be provided with grooves or slots (40,47) that enable elevation and adjustment (44,48) of one end of the base on the work. This allows control of the angle of the post with respect to the work surface, and thus the angle of tool penetration, if other than a perpendicular cut is desired. Threaded securing means (42,46) are provided to secure the desired angular position. The securing means (46) is threaded into the support (17), and clamps the bar (45) to the support (17). The securing means (42) is threaded into the slide (41) and presses against support (17) to secure the slide (41) to the support (17). Graduated scales (25) are provided to assist proper location of the slide (41) and adjust bar (45).

It is believed that the construction, operation and advantages of this device will be apparent to those skilled in the art. It is to be understood that the present disclosure is illustrative only and that changes, variations, substitutions, modifications and equivalents will be readily apparent to one skilled in the art and that such may be made without departing from the spirit of the invention as defined by the following claims.

What I claim is:

1. A tool for use with a guide comprising:
   - a holder for a cutting means having an axis along which said cutting means advances;
   - a gripping means on said tool for manual advancement of said tool;
   - an elongated internal through opening forming a guideway adjacent said gripping means adapted to receive said guide, said guideway being parallel to said axis along which said cutting means advances and extending between said gripping means and said axis along which said cutting means advances.

2. A tool as defined in claim 1, wherein said guideway has a non-circular cross-section.

3. A tool as defined in claim 2, wherein said guideway has a rectangular cross-section.

4. A hand-held guide means for use with a hand-held tool comprising:
   - a base having elongated spaced supports joined together with a cross member, the underside of said spaced supports having exposed coplanar surfaces for supporting said guide means on material to be cut, the area between said spaced supports defining a footprint and an extensive open area for viewing said material and passage of said tool;
   - a post attached to and projecting from said base between said spaced supports and extending above and over said footprint between said spaced supports, at least the central and upper extent of said post being of uniform cross-section and free from obstructions so that said hand held tool may be placed over and slidably moved along said post for guided controlled cutting of said material under said base and slidably removed from said post for independent use without modification;
   - a handle attaching means attached to said base between said spaced supports and a handle attached to said handle attaching means extending over said footprint between said spaced supports;

said handle and said post being positioned above and within the area defined by said footprint so that the line of force applied to said handle is parallel to said post and directed toward said base means, and the line of force applied to any tool supported on said post is parallel to said post and directed toward said base means, so that both lines of force will pass within the area defined by said footprint.

5. The tool guide as defined in claim 4, wherein said post has a non-circular cross-section.

6. The tool guide as defined in claim 4, wherein said post is said handle attaching means and is offset to one side of said base and said handle is attached adjacent the lower end of said post.

7. The tool guide as defined in claim 4, wherein said post is attached to said cross member and is provided with graduations for determining the amount of movement of any tool used therewith.

8. The tool guide as defined in claim 4, wherein said post is provided with adjustable stop means for controlling the depth of penetration of any tool used therewith.

9. The tool guide as defined in claim 4, wherein said supports of said base have apertures to accommodate means for assisting in maintaining the position of said base on the work.

10. The tool guide as defined in claim 9, wherein said base is provided with securing means consisting of screws, pins or friction feet as said means for assisting in maintaining the position of said base on the work.

11. The tool guide as defined in claim 4, wherein said base is provided with means for elevating one end to adjust the angle between the base and surface supporting the base.

12. The tool guide as defined in claim 11, wherein said supports of said base are provided with grooves and a slide means adjustably movable along said grooves as said means for elevating one end of said base.

13. The tool guide as defined in claim 11, wherein said supports of said base are provided with slotted adjusting bars movably attached to said supports as said means for elevating one end of said base.

14. A hand-held tool and guide combination comprising:

said tool having a holder for a cutting means and having an axis along which said cutting means advances;

a gripping means on said tool for manually advancing said tool;

an elongated internal through opening forming a guideway adapted to receive said guide, said guideway being located adjacent said gripping means and in a plane between said gripping means and said axis along which said cutting means advances and being parallel to said axis along which said tool advances;

said guide having a base including spaced supports, the area between said supports defining a footprint;

a post attached to and projecting from said base;

a handle attaching means attached to said base and a handle attached to said handle attaching means, said handle and said post being above and substantially within the area defined by said footprint;

said post passing through said internal guideway of said tool, said post positioned with respect to said base and internal guideway of said tool such that said tool gripping means is above said base so that the line of force applied to said handle is parallel to and in the direction of tool advance, and so that the line of force applied to said tool gripping means is parallel to and in the direction of tool advance, such that both said lines of force pass within the area defined by said footprint.

15. A tool and guide combination as defined in claim 14, wherein said post and guideway are of non-circular cross-section and wherein each is of essentially the same cross-sectional size and shape.

16. A tool and guide combination as defined in claim 15, wherein said cross-sectional shape is rectangular and said post is said handle attaching means and said handle is attached adjacent the lower end of said post.

17. A tool and guide combination as defined in claim 14, wherein said base is provided with means for adjusting the angle between said base and support for said base.

18. A tool and guide combination as defined in claim 14, wherein said post is provided with graduations and stop means for accurate positioning of the tool and control of cut depth.

19. A tool and guide combination as defined in claim 17, wherein said spaced supports of said base are provided with grooves and slotted adjusting bars such that said bars are movable along said grooves as said means for adjusting the angle between said base and support for said base.

* * * * *